(No Model.)
A. HOURDEAUX.
DETACHABLE HANDLE FOR BASKETS.
No. 565,460. Patented Aug. 11, 1896.
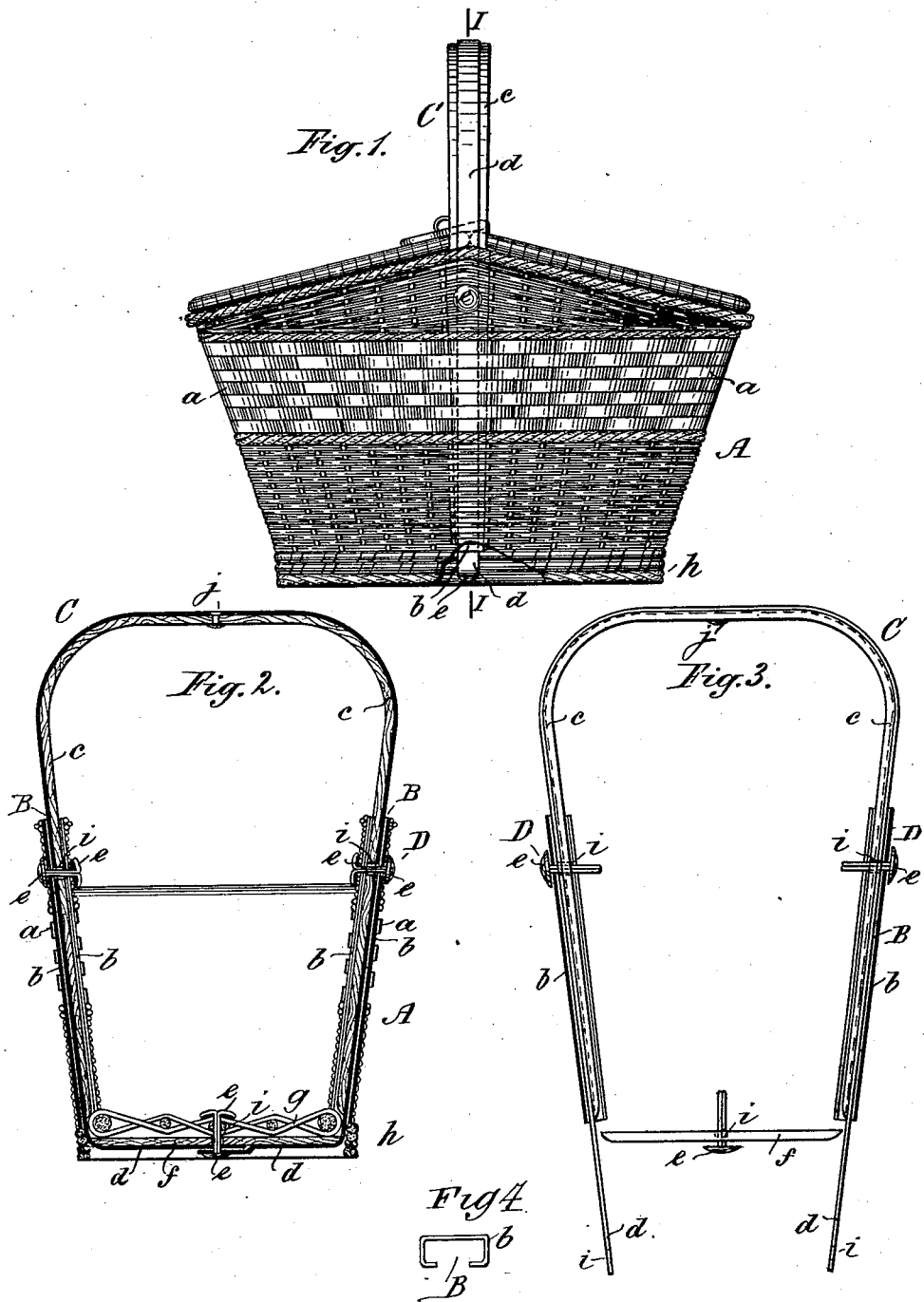
WITNESSES
Fred White
Thomas F. Wallace
INVENTOR
Amédée Hourdeaux,
By his Attorneys

UNITED STATES PATENT OFFICE.

AMÉDÉE HOURDEAUX, OF BAMBERG, GERMANY.

DETACHABLE HANDLE FOR BASKETS.

SPECIFICATION forming part of Letters Patent No. 565,460, dated August 11, 1896.

Application filed June 6, 1895. Serial No. 551,844. (No model.)

*To all whom it may concern:*

Be it known that I, AMÉDÉE HOURDEAUX, a subject of the King of Bavaria, residing in Bamberg, in the Kingdom of Bavaria, German Empire, have invented certain new and useful Improvements in Detachable Handles for Baskets of all Sorts, of which the following is a specification.

This invention relates to handles for portable vessels, as baskets and analogous articles, and aims to provide an improved handle especially applicable to baskets, and improved means for applying and fastening the handle.

Heretofore it has been usual to fixedly connect handles to baskets, especially in the case of wicker-baskets. With such constructions the handle prevents nesting of the baskets when out of use, and prevents their close assembly for transportation or storage during use.

My invention aims to provide a handle which can be easily removed or applied, so that the baskets can be nested or closely packed without handles when desired, the handles being maintained separate from the baskets and applied thereto subsequently as required.

To this end in carrying out the preferred form of the invention I provide a detachable handle, preferably consisting of two longitudinal members, as an inner wooden strip and an outer metal strip, fastened together, having the shape of the desired handle, and having provisions by which they can be securely fastened to the baskets, and I provide the basket or other vessel with handle-receiving sockets into which the handle can be passed to apply it to the basket.

In the accompanying drawings, which show my invention in its preferred form as applied to an ordinary woven or wicker hand basket. Figure 1 is a side elevation, partly broken away, of a basket with handle attached. Fig. 2 is a vertical cross-section thereof on the line 1 1. Fig. 3 is a side elevation of the handle detached, showing the handle-sockets in longitudinal section; and Fig. 4 is an end view of one of the handle-sockets.

Referring to the drawings, let A indicate the basket; $a$, the side walls thereof; B, the handle-sockets in the walls; $b$, the socket-pieces carried by the walls and in which the sockets are formed; C, the handle; $c$, the inner or wooden portion thereof; $d$, the outer or metal portion thereof; $f$, the bottom piece thereof, and D separable fastening provisions between the handle and basket, which provisions in the construction shown consist of bifurcated or detachable rivets $e$, and rivet-apertures $i$ in the handle and basket receiving the shanks of these rivets.

The basket may be any suitable vessel of any known construction. The handle-sockets may be disposed as desired on the walls of the basket and formed in any suitable manner. I prefer to make the handle-sockets upright sockets, and form them by interposing the hollow or tube-like shell $b$ in the side walls of the basket, which shell is preferably of a length equaling the height of the wall carrying it, having a solid outer side and a partially-open inner side, the outer side being traversed by the holes $i$ at a suitable point or points. The socket piece or shell $b$ is retained in position by the hurdle-work or wickerwork of the side walls in the construction shown and is open at top and bottom. At top it is flush with the top edge of the side walls, and at bottom it meets the bottom flange $h$ of the basket near the plane of the bottom $g$ of the latter. The bottom $g$ is slightly elevated, so as to leave a space under the basket when its flange $h$ rests on a plain surface, and the handle-sockets communicate with this space. The handle C is best constructed of two longitudinal strips of different material, but may be of any other suitable or desired construction. I prefer to employ a stiff inner strip $c$, of wood, and a narrower outer strip $d$, of metal, the strips being fixed together as by rivets $j$ or in any other suitable manner, and the outer strip preferably setting partly into a longitudinal groove in the inner strip, as shown in Fig. 3. The wood and metal give the necessary stiffness and strength. The inner strip is preferably shorter than the outer strip, so that the ends of the latter project considerably beyond those of the former. The ends of the inner strips preferably terminate near the bottom $g$ of the basket, while the ends of the outer strip pass below this bottom and are preferably overlapped and fastened beneath the latter. For this purpose an auxiliary or bottom strip $f$, of wood or other material, having substantially the width of the bottom of the basket, is interposed between the ends of the strip and the bottom $g$, and against this the ends are folded or bent. The metal of the strip is sufficiently yielding to permit bending its ends together under the basket or straightening them out from under the latter as the handle is to be applied to or freed from the basket.

Any suitable fastening provisions between the handle and basket may be employed, and the provisions may be disposed at any point. I prefer to fasten the handle at three points, as shown, and to construct the handle with transverse holes $i$, traversing both strips of the legs of the handle, the socket with coinciding holes, and the bottom $g$ and strip $f$ and the ends of the strips $d$ with like holes $i$, and then pass the shanks of the rivets $e$ through these holes, and thereby securely fasten the handle to the basket, preventing escape of the rivets by bending outwardly their ends.

The shape of the handles will be preserved by their construction, and the handle-sockets will be kept clear by the socket-pieces, so that the handles can always be conveniently applied to the basket. When applied, their sustaining tension will be distributed, in the construction shown, over the bottom as well as both sides of the basket, thus giving great stability and durability to the latter. At any time the handles can be separated to permit nesting or close packing, or for any other desired purpose, the operation being simply that of loosening the fastening device, bending straight the ends of the ribbons or strips $d$, and drawing out the handle.

It will be seen that my invention provides improvements in baskets and handles therefor which can be variously and advantageously availed of, and it will be understood that the invention is not limited to the particular details of construction, use, or arrangement set forth as embodying the preferred form of my invention, since it can be employed as circumstances or the judgment of those skilled in the art may dictate without departing from the spirit of the invention.

What I claim is—

1. In handles for baskets, the combination with a basket-body having side walls, of hollow upright metal socket-pieces extending substantially from the top of said walls to the basket-bottom, and having handle receiving and guiding sockets vertically traversing said walls, a detachable handle having legs seating in said sockets and removably held therein, and detachable fastening provisions carried by said pieces and engaging said legs, when in one position irremovably attaching said legs in said sockets, and when freed permitting removal of said legs from said sockets and the detachment of the handle from the body.

2. In handles for baskets and the like, a basket-body having side walls and a bottom wall, in combination with a detachable handle C, consisting of a wooden strip having an upper part and downwardly-extending legs, and a metal strip of greater length than said wooden strip, fastened longitudinally thereof to the outer side thereof with its free ends projecting beyond the extremities of the legs of the handle, said free ends of said metal strip overlapping beneath the bottom wall of said body, and there fastened together and to said body, and means fastening said legs together beneath the bottom of said bottom wall, substantially as and for the purpose set forth.

3. In handles for baskets, a basket-body having side and bottom walls, and having hollow upright socket-pieces $b$ in its side walls and extending from the top thereof to the bottom wall, in combination with a handle having downwardly-projecting legs entering and fitting said socket-pieces, and removable means detachably securing said handle to the body with its legs in said pieces.

4. In detachable handles for baskets, a handle having an upper part, downwardly-extending legs, and inwardly-extending ends, in combination with a basket having side walls embraced by said legs, and a bottom wall above said ends, said ends folding against and overlapping under said bottom wall, a piece $f$ engaging said ends, and a fastening $a$ traversing and fastening said ends and piece together.

In witness whereof I have hereunto signed my name in the presence of two subscribing witnesses.

AMÉDÉE HOURDEAUX.

Witnessess:
GEORG SCHMAUSS,
ADOLPH FOUNTZ.